United States Patent
Gormish et al.

(10) Patent No.: US 8,209,375 B2
(45) Date of Patent: Jun. 26, 2012

(54) COMMUNICATION OF COMPRESSED DIGITAL IMAGES WITH RESTRICTED ACCESS AND SERVER/CLIENT HAND-OFFS

(75) Inventors: Michael Gormish, Redwood City, CA (US); Serene Banerjee, Bangalore (IN)

(73) Assignee: Ricoh Co., Ltd., Tokyo (JP)

( * ) Notice: Subject to any disclaimer, the term of this patent is extended or adjusted under 35 U.S.C. 154(b) by 1532 days.

(21) Appl. No.: 10/383,843

(22) Filed: Mar. 7, 2003

(65) Prior Publication Data

US 2004/0205199 A1 Oct. 14, 2004

(51) Int. Cl.
*G06F 15/16* (2006.01)
*G06F 15/173* (2006.01)

(52) U.S. Cl. ........ 709/203; 709/217; 709/218; 709/219; 709/223; 709/225

(58) Field of Classification Search ................. None
See application file for complete search history.

(56) References Cited

U.S. PATENT DOCUMENTS

| | | | |
|---|---|---|---|
| 5,774,660 A * | 6/1998 | Brendel et al. ............. 709/201 |
| 6,148,333 A * | 11/2000 | Guedalia et al. ............ 709/219 |
| 6,463,431 B1 * | 10/2002 | Schmitt ........................ 707/5 |
| 6,470,389 B1 * | 10/2002 | Chung et al. ............... 709/227 |
| 6,628,417 B1 * | 9/2003 | Naito et al. ................ 358/1.15 |
| 6,631,298 B1 * | 10/2003 | Pagnano et al. ............. 700/19 |
| 6,643,666 B1 * | 11/2003 | Kernz ....................... 707/104.1 |
| 6,721,952 B1 * | 4/2004 | Guedalia et al. ............ 725/38 |
| 6,732,117 B1 * | 5/2004 | Chilton .................. 707/103 X |
| 6,928,458 B2 * | 8/2005 | Cedola et al. .............. 707/203 |
| 6,993,580 B2 * | 1/2006 | Isherwood et al. .......... 709/225 |
| 7,006,996 B2 * | 2/2006 | Hasegawa ..................... 705/52 |
| 7,072,984 B1 * | 7/2006 | Polonsky et al. ............ 709/246 |
| 7,149,189 B2 * | 12/2006 | Huntington et al. ......... 370/235 |
| 7,191,467 B1 * | 3/2007 | Dujari et al. .................... 726/5 |
| 7,197,513 B2 * | 3/2007 | Tessman et al. .................. 1/1 |

(Continued)

FOREIGN PATENT DOCUMENTS

EP 0614308 A1 * 9/1994

OTHER PUBLICATIONS

Carlos Serrão, José Miguel Salles Dias. "Space and Planetary Imaging using JPEG2000" ESTEC, Netherlands, published 2002, http://hdl.handle.net/10071/265.*

(Continued)

*Primary Examiner* — Thu Nguyen
*Assistant Examiner* — Angela Widhalm
(74) *Attorney, Agent, or Firm* — Blakely, Sokoloff, Taylor & Zafman LLP

(57) ABSTRACT

A method and apparatus for handling restricted access and server/client handoffs in a communication environment is described. In one embodiment, the method includes receiving a first request for a first set of image data corresponding to an image, and responding to the first request with the first set of image data. The method may also include receiving a second request for a second set of image data corresponding to the image and determining that the second set of image data includes restricted data. A prompt for authentication may then be sent. The method may also include receiving the second request along with authentication information, determining again that the second request is for restricted data, and checking the authentication information. If the authentication information is correct, the method may also include providing the second set of image data.

28 Claims, 6 Drawing Sheets

U.S. PATENT DOCUMENTS

| | | |
|---|---|---|
| 7,257,546 B2 * | 8/2007 | Ebrahimi et al. .......... 705/14.73 |
| 7,441,047 B2 * | 10/2008 | Gibbs et al. .................. 709/248 |
| 7,454,516 B1 * | 11/2008 | Weinert et al. ............... 709/235 |
| 7,461,150 B1 * | 12/2008 | Boulia .......................... 709/227 |
| 7,725,588 B2 * | 5/2010 | Yamakawa et al. .......... 709/229 |
| 2001/0030667 A1 * | 10/2001 | Kelts ............................ 345/854 |
| 2001/0049719 A1 * | 12/2001 | Nakajima .................... 709/203 |
| 2002/0085030 A1 * | 7/2002 | Ghani ........................... 345/751 |
| 2002/0122075 A1 * | 9/2002 | Karasawa et al. ............ 345/846 |
| 2002/0169889 A1 * | 11/2002 | Yang et al. ................... 709/244 |
| 2002/0178254 A1 * | 11/2002 | Brittenham et al. .......... 709/224 |
| 2003/0028795 A1 * | 2/2003 | Tomomatsu et al. ......... 713/193 |
| 2003/0067627 A1 | 4/2003 | Ishikawa et al. |
| 2004/0044724 A1 * | 3/2004 | Bell et al. ..................... 709/203 |
| 2004/0064704 A1 * | 4/2004 | Rahman ........................ 713/182 |
| 2004/0193921 A1 * | 9/2004 | Byrne ........................... 713/201 |
| 2005/0086211 A1 * | 4/2005 | Mayer ............................... 707/3 |

OTHER PUBLICATIONS

U.S. Appl. No. 10/313,406.*

U.S. Appl. No. 10/119,869.*

U.S. Appl. No. 09/921,138.*

\* cited by examiner

Image divided into tiles and subbands.

Subbands divided into precincts

MSB

LSB

Codeblock divided into bitplanes and coding passes

Subbands combine to produce various resolution images

COMMUNICATION OF COMPRESSED DIGITAL IMAGES WITH RESTRICTED ACCESS AND SERVER/CLIENT HAND-OFFS

FIELD OF THE INVENTION

The present invention relates to the field of compressed digital images; more particularly, the present invention relates to the use of communication in conjunction with the processing of compressed digital images.

BACKGROUND

As more use is made of digital images and digital images become larger in size, the ability to communicate portions of an image is essential to efficient and rapid communication. Indeed the Joint Photographic Experts Group (JPEG) recognized the importance of various access features in the design of the JPEG 2000 image compression standard. JPEG 2000 allows the location in the codestream of relevant portions of an image by reading header information in the JPEG 2000 file and thus provides efficient access to local files. However, much image communication takes place across a network of some sort and many different clients may access portions of the same imagery. Thus it is important to have a standard protocol for communicating portions of a compressed image across a network. The JPEG international standards committee is currently developing "JPEG 2000 Image Coding System—Part 9: Interactivity Tools, APIs and Protocols," also called JPIP, which will eventually become a standard for communication of imagery across a network.

JPEG 2000 Background

Some important ideas from JPEG 2000 are shown in FIG. 3, which shows some portions of a JPEG 2000 system. An original image may be divided into regular tiles. These tiles are compressed independently. Thus, the coded data from the upper left tile is sufficient to reconstruct the upper left part of the image. Likewise any region can be reconstructed by obtaining the data from all the tiles that intersect that region and decoding them.

The JPEG 2000 encoder performs a two dimensional wavelet transform on each tile. This leads to a set of wavelet coefficients grouped in subbands. One of the subbands is a low resolution version of the image—it is exactly the same image as would be obtained by operating a particular low pass filter on the entire image and subsampling. Importantly, that subband can be combined with other subbands to form intermediate resolution versions of the image. Thus, a JPEG 2000 codestream provides access to images at low resolution, and resolutions larger by a factor of 2 horizontally and vertically, up to the full resolution of the image.

The wavelet transform coefficients are regrouped into "precincts." These precincts form an alternative mechanism to access spatial regions of an image. To decode the upper left part of an image, the coded data for the precincts in the upper left part of each subband can be obtained and decoded. Because a wavelet transform coefficient affects multiple pixels in the image, and coefficients in different subbands affect different numbers of pixels, and each pixel is affected by multiple coefficients, it is necessary to carefully determine all the precincts that might be necessary to decode a particular region of the image.

Tiles and precincts can both be used when compressing an image. If both are used, the tile provides a coarse grain access to regions of the image, while the precincts provide access to more localized regions.

Finally, precincts are divided into code-blocks and these code-blocks of wavelet coefficients are compressed with multiple passes, starting with the most significant bit and proceeding to the less significant bits. These "coding-passes" remove statistical redundancy in a lossless manner. For example, large numbers of zero bits are replaced by much shorter codes. The fixed sized block of wavelet coefficients thus becomes a variable length segment of coded data. The first part of the segment is the most important part because it corresponds to the most significant bits of the wavelet coefficients. If the later parts of the coded data segment are not available to a decoder, an image can still be obtained; it is just of lower quality.

A "codestream" is defined in JPEG 2000 Part 1. It consists of a series of "marker segments" which are essentially two byte codes identifying the next portion of data in the codestream, followed by the data. There is a "main header" that starts with "SOC" and "SIZ" marker segments. The SIZ marker segment contains information about the width and height of the image components. The "COD" and "COC" marker segments contain parameters describing how the compressed data should be decoded. After the main header, there are a series of "tile-parts." Each tile-part begins with a "SOT" marker segment that identifies the particular tile and part. The coded data for each tile-part is preceded by a "SOD" marker segment. The codestream contains all the entropy coded data for the image, and data describing the method which should be used to decode the coded data. The codestream contains information about the wavelet transform used, the size of tiles, precinct sizes, information about the number of resolutions, the order of packets in the file, etc. The codestream must contain all the parameters needed to decode the entropy coded data into image samples. The codestream may also contain information to provide rapid access to portions of the coded data, e.g. lengths of the packets.

A "file-format" is a wrapper for one or more codestreams. JPEG 2000 Part 1 defines a simple "JP2" file format. JPEG 2000 Part 2 includes a definition of the "JPX" format to store more complex information. JPEG 2000 Part 3 defines the "MJ2" file format for motion JPEG 2000. JPEG 2000 Part 6 defines the "JPM" file format for compound documents. There are also file-formats not defined by the JPEG 2000 committee that could contain JPEG 2000 codestreams. For example, the DICOM file format is extensively used in the medical community. TIFF and PDF are file formats that already allow multiple compression types and could easily be extend to allow JPEG 2000 codestreams. File-formats typically provide "meta-data" associated with the image data contained in the codestream e.g. audio, XML information, and image capture conditions. The file format also commonly contains information about the color space of the decoded image data.

JPIP Background

Requests

JPIP defines several parameters that can be used by a client in making a request. These requests indicate what sub-image the client is interested in. The requests may also include information about the compressed data already received by a client so the server will not repeat the data. The requests also may provide information about what meta-data the client is interested in and information to control the type of response given by the server. Some of these parameters include frame-size, region offset, and region size.

The frame-size parameter, which appears as "fsiz=128, 128" in several examples, indicates the size of the entire image the client wishes to use to access a region. If there is no region size parameter (see below), the frame-size is simply the size of the image the client wants. For example, an image which is 512 by 512 samples and encoded with 4 levels of wavelet transform can be accessed with a frame size of 512 by 512, 256 by 256, 128 by 128, 64 by 64, or 32 by 32. In the first request to the server, the client may not know the actual frame-sizes available. In this case, the client can indicate a desired size and a rounding method, and the server will return the closest available size (and the other parameters will be scaled to match the actual frame size used).

The region offset parameter, which might be used as "roff=64,64", indicates that the client is not interested in the entire image, but only in a region beginning at the offset specified by the two values given in the request. The offset is relative to the request frame-size.

The region parameter, which might be used as "rsiz=64, 64", indicates the size of the region desired by the client. Instead of providing the three parameters fsiz, rsiz, and roff, a client may indicate interest in file- or server-defined regions of interest with the "roi" parameter. The roi parameter can be used to request a named region identified in one of the file format boxes. The value may be set to "dynamic" as in "roi=dynamic" to indicate that the server should choose the appropriate region based on any knowledge of the client.

Session Management

JPIP can operate without any memory in the server. To be efficient in this case, the client needs to provide a list of relevant received data with each query. This can be done with the "model", "tpmodel", or "needs" parameters. To begin a session, a client might issue a request for a channel-id with "cid=0". The server response indicates a value that will be used for the channel. All future requests using the same channel will be assumed to have the same cache. Multiple sub-images of the same image can be requested and received in parallel by using different channels.

Responses

JPIP responses can take three main forms: complete image file, tile-part stream, or precinct stream. The complete image file return type is essentially like returning a custom file that has been generated on the basis of the request. The two stream return types are compound responses that consist of a series of small "messages." Each message has a header that identifies its type, its index within that type, the offset of the message into the "data-bin" with that type and index, and the length of the message. The data-bins can be thought of as representing all information a client might ever request about a resource on the server. In response to a single request, a server might deliver a portion of several different data-bins. The messages typically do not contain a complete data-bin, instead they contain a portion of the data-bin that has not yet been sent to the client. Small message sizes allow data for different portions of the image to be interleaved, and thus a region specified by the client can grow uniformly in quality. Likewise, image data may be interleaved with meta-data. Providing the lengths of each message allows the stream to be elegantly terminated at the end of any message. This allows a server to stop responding to one request and begin responding to a new request on the same communications channel.

Tile-Part Return Type

JPIP defines a way to return a sub-image as a set of tile-parts, called a JPT-STREAM as an abbreviation for JPIP tile-part stream. Tile-parts are defined in the JPEG 2000 Part 1 standard. Each tile-part contains part of the compressed data for a tile. Because a normal JPEG 2000 decoder must be able to handle tiles provided in any order, a JPIP client receiving tile-parts can concatenate them to obtain a legal JPEG 2000 codestream, which a standard decoder can use to produce an image. Because tile-parts are self-labeled parts of a JPEG 2000 codestream, a server can simply select portions of a pre-existing file and send those in response to a request. More complex servers could rewrite the file on the basis of the request into a different division of tile-parts; this can provide more efficient responses at the expense of server computation.

Precinct Return Type

JPIP defines a way to return a sub-image as a set of byte ranges of precincts, also called a JPP-STREAM as an abbreviation for JPIP precinct stream. Precincts are defined in the JPEG 2000 Part 1 standard. A client must collect all bytes ranges corresponding to the same precinct and pass these on to a special JPIP precinct decoder which understands the precinct identifiers. This special purpose decoder determines which precincts to decode to generate a sub-image. Because precincts can vary in size with each resolution and byte ranges of precincts have low overhead, this method provides very fine grain control on the progressive improvement of the image with succeeding requests.

FIG. 6 shows the structure of a precinct data-bin. If the entire precinct data-bin was present in a file, it would consist of a sequence of packet headers (PH in FIG. 6) and packet data (PD in FIG. 6). The packet header contains information about which code-blocks have data in the packet data portion of the packet, information about the number of bytes stored for each code-block, and the number of coding passes for each code-block. There is no information in the packet header to identify which component, position, resolution, tile or layer it belongs to. There is also no explicit information about the length of the packet header. The length of the packet data can be determined by adding up the lengths of data for all the code-blocks in the packet. The length of the packet header can only be determined by decoding it. The short lines in the PD boxes in FIG. 6 represent the division between code-blocks.

For a packet in the lowest resolution, the code-blocks are all for the LL subband. For other resolutions, there are 3 packets for each layer, one for the HL subband, one for the LH subband, and one for the HH subband. FIG. 6 also shows a higher resolution, and thus the label at the bottom shows three packets associated with each layer.

Data-bins are not necessarily delivered in complete packets. A JPP-STREAM consists of a sequence of messages. Each message indicates the type of data-bin information contained (mainheader, meta-data, precinct, or tile-header). There is also an indication if the message contains the final portion of data for the data-bin. Each message also indicates the starting position in the data-bin and the length of the message. Finally, each precinct data-bin contains an identifier that indicates for which tile, component, position, and resolution the data-bin is. These messages are shown on the top part of FIG. 6. Messages may be received in any order, but each message for the same precinct indicates a starting position and a length. There may be gaps in the data received as shown in FIG. 6.

Full Image Return Type

The simplest JPIP return type from the client point of view is a complete image of only the sub-image in which the client is interested. This can be obtained by having the server decode the relevant portion of the image and re-encode it in a format understandable by the client, e.g., the server could return a classic JPEG, a portable network graphics image (PNG) or a JPEG 2000 image. The advantage of returning a full image is it can work with current client without modification and without knowledge of JPEG 2000 or JPIP. However, this return type requires a lot of computation to be done by the server. If the client understands (can decode) JPEG 2000, it is often possible for a server to "parse" the JPEG 2000 image and return a legal JPEG 2000 file that only contains data for the part in which the client is interested. Even the parsed JPEG 2000 image return type is not efficient for multiple sub-image requests, because the same portion of the image may be returned several times.

Thus, JPEG 2000 provides a codestream, which can be accessed to extract data that pertains to a particular spatial region, a particular color component, a particular spatial resolution, and a particular quality layer. JPIP provides a way to make requests for a particular region, component, resolution and quality. JPIP also defines mechanisms to return subsets of a JPEG 2000 codestream in a way that the client can identify which portions of the data it has received, decode those portions and produce an image.

Anticipated Uses of JPIP

The editors of the JPIP standard collected a variety of potential uses for interactive image communication. These "use cases" are described in detail in ISO/IEC JTC 1/SC 29/WG 1 N2656, published Jul. 15, 2002. One key area of the application of JPIP is the browsing of a large image. Many images are several thousand pixels across, and some small portable display devices (e.g., cell phones, personal digital assistants, etc.) have displays of only 100 pixels by 100 pixels. JPIP provides a way to look at low resolution versions or portions of these large images. Systems have been envisioned with a global positioning system (GPS) device that automatically updates a small screen with high resolution data corresponding to the exact location of the screen. This data could be extracted from within a very large JPEG 2000 image.

There are several areas of applications for JPIP capabilities including aerial imagery, medical imagery, and pre-press imagery. The nature of the network also varies tremendously (e.g., error free vs. frequent errors, high bandwidth vs. low bandwidth). In the consumer market, it is anticipated that JPIP could be used to browse photos, and one can imagine digital cameras with JPIP servers. JPIP can be useful for monitoring applications where low resolution/quality images are observed under "normal" conditions, but high resolution/quality images are needed when something happens. In some cases (e.g., a security camera), multiple images are of interest.

It is anticipated that JPIP will be used with document imagery (mixed text and graphics). JPIP might contain ways to allow special purpose servers to be a part of a main JPIP server (i.e., plug-ins to the JPIP server for a specific type of imagery (e.g., a JPM document)). Alternatively, JPIP might be used inside a main server (e.g., an Apache server with a JPIP plug-in) or a PDF server that uses JPIP for transport of images within a PDF file. While JPIP contains special facilitates for dealing with JP2, JPX, JPM, and MJ2 style file formats (all file formats with a similar "box" structure), JPIP will also be used to deliver codestreams stored inside other file formations, (e.g., DICOM, SVG, remote sensing file formats, etc.)

Backward Compatibility by Transcoding Images to Serve Current Browsers

JPIP provides for migration from JPEG to JPEG 2000. Current browsers do not support JPEG 2000 images or JPIP without plug-ins. However, a server can be designed to convert JPEG 2000 image to JPEG images when portions of those images are requested. The current syntax to request a 256 pixel by 256 pixel scaled version of "image.jp2" converted to JPEG via HTTP is:

GET/image.jp2?fsiz=256,256&type=image/jpg HTTP/1.1
Host: www.server1.com

Such a request is automatically generated by browsers when encountering an image tag in an HTML file of the following form:

<img href="http://www.server1.com/image.jp2?fsiz=256, 256&type=image/jpg">

Thus, current browsers can access portions of JPEG 2000 files and display them without any plug-ins.

Capability Controlled Image Response

It is anticipated that the response the server provides to a particular window request may depend on several factors. For example, if the server determines the client has a limited resolution or limited color capabilities, the server might select the data transmitted in the response to match the capabilities. If the client requests a server determined region (by using the "roi=dynamic" request parameter), then the server can even choose the spatial portion of the image to return based on client capabilities. A request indicating the client can only process a 1 bit per component image and also has a particular vendor feature (vf) might look like:

```
GET
/image.jp2?fsiz=2048,2048&roi=dynamic&cap=config.mbit=1,
vf.486574658767465A4865
74658767465A HTTP/1.1
Host: www.server1.com
```

There have been systems to communicate portions of images before JPIP. For example the Internet Imaging Protocol (IIP), Version 1.0.5, 6 Oct. 1997, provided access to Flash-Pix files. JPIP is expected to be much more efficient than IIP and FlashPix, in part because FlashPix stored multiple resolutions of the same image redundantly.

M. Boliek, G. K. Wu and M. J. Gormish, in "JPEG 2000 for Efficient Imaging in Client/Server Environment", *Proc. SPIE Conf. on App. of Digital Imaging*, vol. 4472, pp. 212-223, Jul. 31-Aug. 3, 2001, San Diego, Calif., define a client/server environment to transport JPEG 2000 images and provide examples of JPEG 2000 byte usage in a "pan and zoom" session and describe a protocol based on Internet Imaging Protocol (IIP), Version 1.0.5, 6 Oct. 1997.

There are several other techniques for transport of sub-images listed in ISO/IEC JTC 1/SC29 WG1 N2602, 3 Jul. 2003, "TRUEW: Transport of Reversible and Unreversible Embedded Wavelets (A JPIP Proposal)," including submissions to the JPEG committee for the JPIP standard.

The current JPIP working draft is ISO/IEC JTC 1/SC29/WG 1 N2834, 28 Feb. 2003, "JPEG 2000 image coding system—Part 9: Interactivity tools, APIs and protocols—Working Draft version 3.0.

SUMMARY OF THE INVENTION

A method and apparatus for handling restricted access and server/client hand-offs in a communication environment is described. In one embodiment, the method comprises receiving a first request for a first set of image data corresponding to an image, responding to the first request with the first set of image data, receiving a second request for a second set of image data corresponding to the image, determining that the second set of image data includes restricted data, sending a prompt for authentication, receiving the second request along with authentication information; determining again that the second request is for restricted data, checking the authentication information, and providing the second set of image data if the authentication information is correct.

In an alternative embodiment, the method comprises a first server operating within a JPIP session with a client, including receiving a first request from the client for a sub-image of an image, generating a response containing data needed to create the sub-image, receiving a second request from the client for a different portion of the image, and the first server redirecting the client to a second server to obtain the different portion of the image.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

DETAILED DESCRIPTION OF THE PRESENT INVENTION

Figure 1:
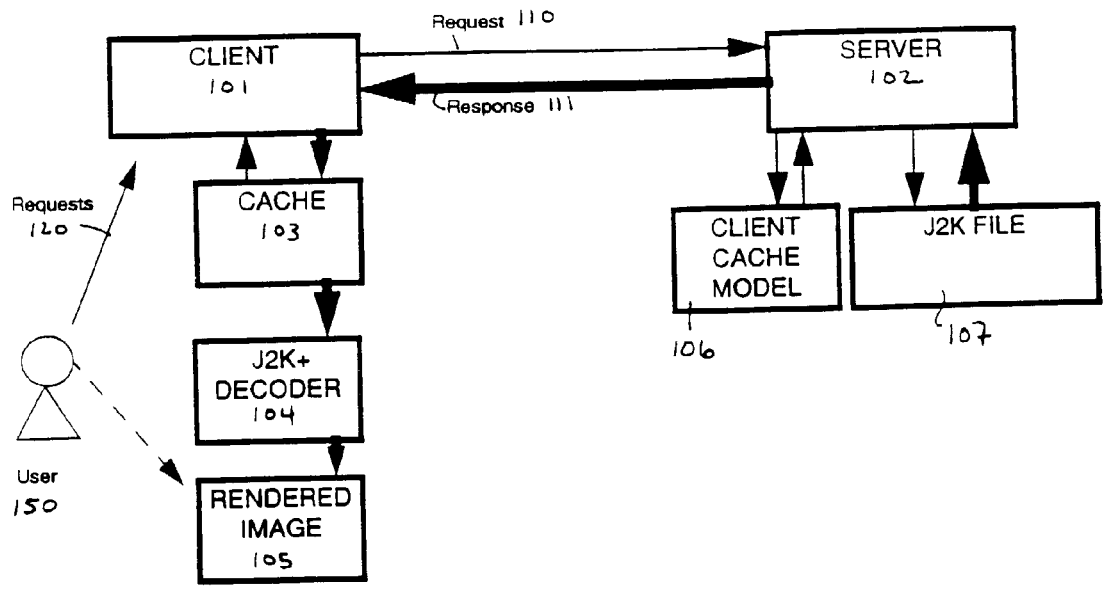
FIG. 1 illustrates a client and server for communication of compressed images.

The following disclosure describes techniques that may be useful in implementations or applications of the nascent JPIP standard or similar image communication protocols. Some of the inventions are described in terms of HTTP, but could easily be modified to other protocols just as JPIP will be modified to operate over other protocols. Note that the syntax of the JPIP standard is in flux currently, but these techniques will work with simple modifications to reflect the changes in syntax in the JPIP standard. Also note that many techniques described herein are also useful with other image protocols besides JPIP.

In the following description, numerous details are set forth to provide a more thorough explanation of the present invention. It will be apparent, however, to one skilled in the art, that the present invention may be practiced without these specific details. In other instances, well-known structures and devices are shown in block diagram form, rather than in detail in order to avoid obscuring the present invention.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A machine-readable medium includes any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; electrical, optical, acoustical or other form of propagated signals (e.g., carrier waves, infrared signals, digital signals, etc.); etc.

Client, Server, and Network

FIG. 1 illustrates one embodiment of a networked environment that may be used for client and server communication of compressed images. Referring to FIG. 1, server 102 typically has the entire image, or at least provides access to the portions of the image which it has. Server 102 is connected over some sort of network to at least one client, such as client 101. Client 101 is often a "program" controlled by a human user, but could also be a completely automated system. Client 101 issues requests, such as request 110, for some subset of the image and receives responses, such as response 111, containing compressed image data that corresponds in someway to request 110. Because of network bandwidth or resources of server 102 or the structure of the file requested, client 101 may receive more or less data than the portion of the image requested. Client 101 typically issues additional requests for different portions of the image and receives more coded data that augments the previously received data. Fundamental to JPIP is the ability to avoid repeating data the client has already received. There are two ways to avoid this data retransmission.

In some cases, client 101 includes information about the data already received in the request sent to server 102 so server 102 need not send back redundant data. This allows server 102 to operate in a "stateless" manner, i.e., no memory of previous interactions are necessary. In other cases, client 101 and server 102 may establish a "session" and server 102 may keep track of the data previously sent to client 101. Client 101 may change the portions of the image it is interested in even before receiving all of the previously requested data. Some servers will be able to interrupt responses to previous requests in order to serve these changing interests.

Figure 2:
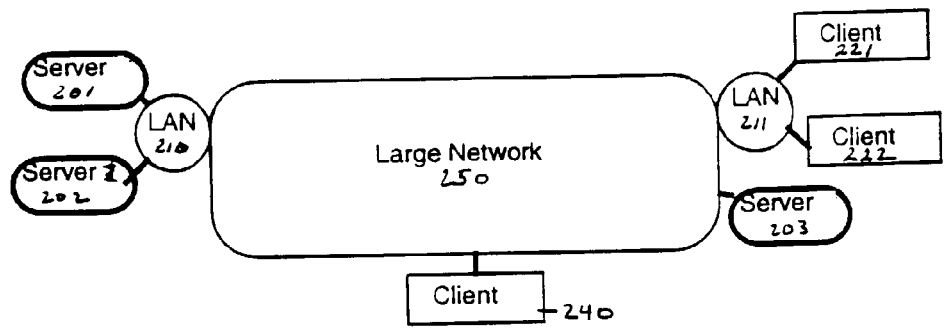
FIG. 2 illustrates a typical network.
Figure 3:
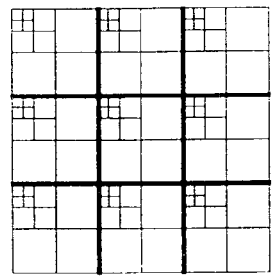
FIG. 3 illustrates components of a JPEG 2000 system.
Figure 3:
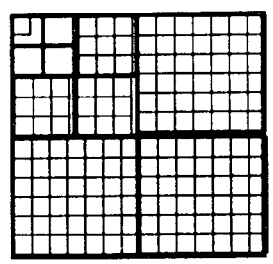
Figure 3:
Figure 3:
Figure 3:
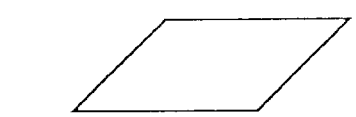
Figure 3:
Figure 3:
Figure 3:

FIG. 2 illustrates a typical network. Referring to FIG. 2, the network includes multiple clients (e.g., clients 221, 222, 223) and multiple servers. A single server may serve different portions of the same image to millions of different clients. A single client may receive images and other data (e.g., HTML pages) from several servers. Proxy servers may be in the network to allow quick responses to some requests without need to contact the original server. The bandwidth available and the bandwidth cost may vary widely between different clients and the same server, or between different servers.

The most commonly used network is the internet or world-wide-web but JPIP and the inventions herein can be applied on local area networks or any general interconnection system. Likewise, it is anticipated that JPIP will most commonly be transported "on top of" the Hyper Text Transport Protocol (HTTP), but it will be usable with other transport protocols including TCP/IP and UDP.

The current JPIP draft standard specifies requests and responses for both image data and image meta-data. While it is possible to transport image data that has been compressed in a variety of ways, JPIP is concerned primarily with JPEG 2000 compressed data because JPEG 2000 allows access to various portions of the image and file.

Partial Image Upload

The current version of the JPIP working draft does not provide a detailed description for uploading sub-images. Of course, complete files may be uploaded to a server using a variety of methods currently used for file transfers including the HTTP PUT command, the FTP put command, WebDAV, and file sharing systems like NFS, SAMBA, AppleShare, etc. None of these methods is capable of transferring a sub-image and integrating it with image data already available on the server.

One use for such a partial image upload might happen with a digital camera with wireless connectivity. A low resolution image might be uploaded to provide a quick view of the image. However, the full image might not be uploaded until a higher bandwidth connection was available, for example a wired connection. In this case, after connecting to the wired network, it is desired to only upload the higher resolution portions of the image rather than repeating the data already uploaded on the wireless link.

Figure 4:
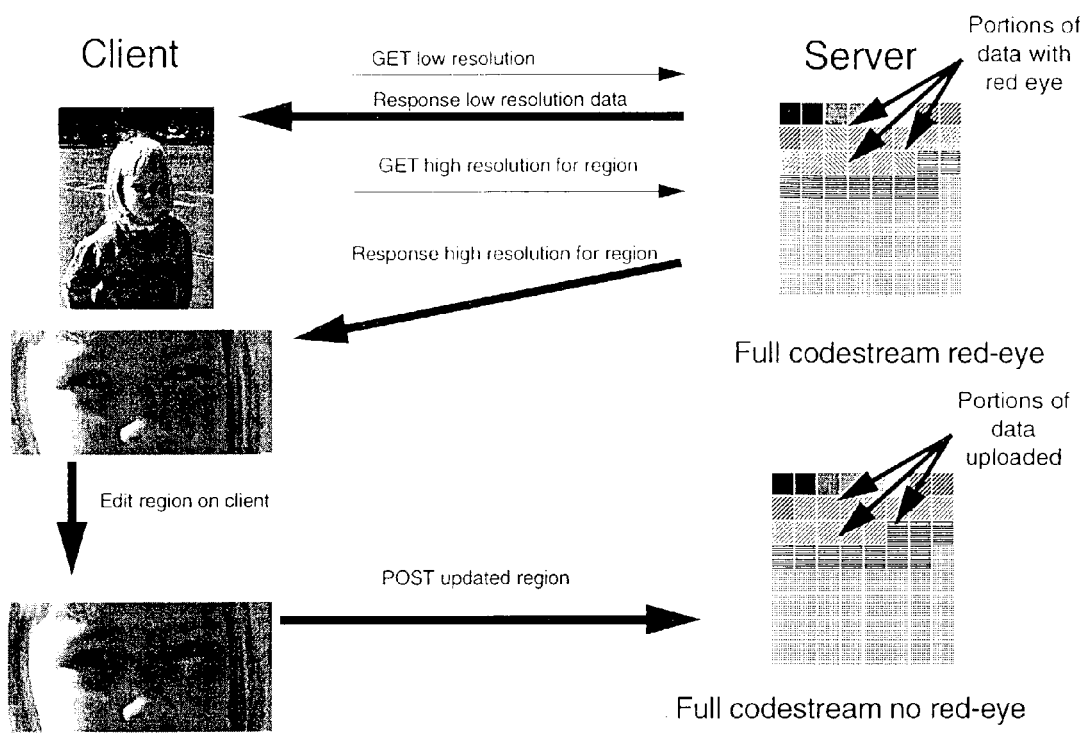
FIG. 4 illustrates remote editing and compressed sub-image upload.
Figure 5:
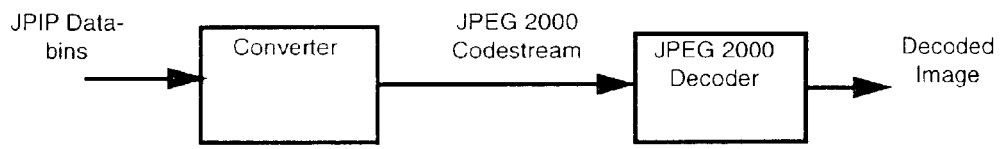
FIG. 5 illustrates a JPP-STREAM to JPEG 2000 codestream conversion.

A second use for partial image upload occurs in a remote editing situation as shown in FIG. 4. In this case, a remote client can download portions of the image, determine a particular region that must be edited, apply the edits locally, and then compress the changed portion, and upload the changed portions to the server. For each step there is a request to the server and a response. An example editing session roughly corresponding to FIG. 4 using tile-parts for the partial image data, JPIP like syntax for the requests and the responses, and HTTP for the transport follows.

First, the client makes an initial request to the server for a particular image at low resolution. This client also requests the server to start a session by including the

```
"cid=0" parameter:
GET /jenny.jp2?fsiz=512,512&cid=0 HTTP/1.1
Host: truew2.crc.ricoh.com
CRLF
```

The server responds with tile-parts corresponding to the whole image, but only at low resolution:

```
HTTP/1.1 202 Accepted
Transfer-Encoding: chunked
Content-type: image/jpt-stream
JPIP-cid: 5378993
CRLF
[ENCODED JPIP TILE-PART STREAM DATA,
IN CHUNKED TRANSFER FORMAT]
```

Note that the server provides a particular channel identifier in the line "JPIP-cid: 5378993". This id is provided in future requests to allow the server to remember what data was previously sent to this client. Note also that the server is returning the data in "chunked" transfer encoding. This format is defined in the HTTP specification and allows the server to send a response without indicating the length in advance. It also allows the client to determine if the server finished one response and began a response to the next query. After receiving some of the chunked data, the client can display a low resolution image.

Using the display, the user determines that there is a problem with red-eye and zooms in on that part of the image. While the client may have issued the first request without knowing the actual size of the image, after the first response, the client can determine the full image size and the exact region corresponding to the user's desired zoom. The client can thus issue a new request for full resolution data from a location selected on the low resolution image (in some cases, there might be multiple requests as the user viewed the image at different resolutions) as follows:

```
GET /jenny.jp2?fsiz=1600,1200&rsiz=512,256&roff=
512,512&cid=5378993 HTTP/1.1
Host: truew2.crc.ricoh.com
CRLF
```

Because the client requested a channel id ("cid=0") in the first request, and included the channel id (cid=5378993) in the second request, the server maintained a list of the tile-parts sent to the client, and in the second response sends only newly required tile-parts. The client could have achieved the same behavior by telling the server the tile-parts it had already received. In any case, the server provides more data:

```
HTTP/1.1 202 Accepted
Transfer-Encoding: chunked
Content-type: image/jpt-stream
JPIP-cid: 5378993
CRLF
[ENCODED JPIP TILE-PART STREAM DATA,
IN CHUNKED TRANSFER FORMAT]
```

In one embodiment, the client prevents the end user from editing the image until all data has been received for the region the user is trying to edit. This could be done by disabling selection of any drawing tools, for example. Alternatively, a dialog box could be displayed warning the user not to edit a partially received image. If the client doesn't wait for all tile-parts, the edit will occur on quantized decoded data and the upload could cause the server to replace high quality tiles with edited but low quality tiles. This loss can be prevented as follows. Each tile-part contains both a index (Isot), a part number within that file (TPsot), and the number of tile-parts for the tile (Nsot) which may be zero if the number of tile-parts is unknown, but should be nonzero for the last tile-part (see JPEG 2000 Part 1). The client knows the last tile-part has been received for any tile when TPsot is equal to Nsot-1.

Once the client has all the data for the region of interest, and the user has finished editing, the client needs to prepare the changed region for uploading. In one embodiment, the client compresses all of the edited tiles in the same manner as the received tiles were compressed, i.e. the same number of levels of wavelet transform, the same wavelet filter, the same code-block size, etc. Then the client uploads all tile-parts for edited tiles. Alternatively, the client could choose to upload only the first few tile-parts for edited tiles, but the result will be that the server has a lower quality image. The client upload might look like this:

```
POST /jenny.jp2?upload HTTP/1.1
Host: truew2.crc.ricoh.com
Content-type: image/jpt-stream
Content-length: 150678
CRLF
[150678 bytes of JPT-STREAM data]
```

When the server receives this request, it determines that it is a request to upload rather than a request for download. In one embodiment, and in this example, that information is provided by the upload parameter in the query-string. Alternatively, the server could tell from the "Content-type:" line that this was not a request. The "Content-type:" of a POST request for image data might be jpt-stream/request, or "application/x-www-form-urlencoded." The server uses whatever method for which it has been configured in order to determine if the client has permission to upload the image (this lies outside of the JPIP standard, but typical HTTP methods can be used). For example, a server might use the same method used to determine if a user may execute an HTTP PUT request. In one embodiment, if the client has permission, the server removes all tile-parts in the current file for which there is a tile-part in the uploaded data stream and then combines the uploaded tile-parts with the remaining tile-parts. Alternatively, the server might choose to just add the new tile-parts to the end of the codestream, or the server might rewrite the entire codestream in the order preferred by the server. If the codestream has informative marker segments (e.g., TLM or PLT marker segments), these are removed or adjusted to be correct (based on the lengths of the new tile parts and precincts). Finally, the file format wrapper is adjusted to contain the new codestream. For example, a contiguous codestream box that contains the length of the codestream might need to have the length adjusted.

Partial Image Upload with JPP-STREAM

The same procedures to download portions of an image, edit them, and upload can be used with the JPP-STREAM type. In this case, the client detects that the data for the entire precinct has been received when the "completed precinct data-bin class code" (as set forth in the JPIP standard) has been received. It is more difficult for the client to determine which precincts have been completely received because of the overlapping effect, but the computation is the same as the server does when given a window request and returning precinct data.

Again when the client has all relevant data, editing may proceed. Compression should be done in a manner similar to the original file. Once again, in one embodiment, the server deletes all data for precincts for which new data is uploaded. Finally, the server recreates a legal codestream from the new precinct data. The server can replace the data-bins for the JPEG 2000 codestream and create a file as described below.

Note that a server sometimes provides images to clients with a different precinct size than the JPEG 2000 codestream stored on disk. In this case, the server might refuse to accept uploads. Alternatively, the server could transcode the received precinct sizes back to the size used for disk storage; this would involve rewriting the packet headers, but compressed data for code-blocks would not change.

Partial Image Upload Using Complete Image Types

It is also possible for a server to accept uploads of a sub-image which has been encoded as a full image. For example, the client might edit part of the image and compress the edited region using JPEG (not JPEG 2000). In addition to a legal file, the client provides the location within the full image of the edited region. This might be done as follows:

```
POST /image.jp2?fsiz=1600,1200&roff=257,513&rsiz=
258,354&upload HTTP/1.1
Host: truew2.crc.ricoh.com
Content-type: image/jpeg
Content-length: 50698
CRLF
[50698 bytes of JPEG DCT data]
```

In this case, the server uncompresses the uploaded sub-image, uncompresses some portion of the full image on the server, replaces the pixels in the spatial domain (uncompressed), recompresses all tiles or precincts affected by the spatial merge, and merges the recompressed portion in the same manner as if the client had provided correctly compressed imagery. This technique requires more computation on the server, however, it does lower the probability that the client will compress the image in an incompatible way (e.g., the wrong number of levels of wavelet transform). Such an incompatibility could cause the uploaded sub-image to become useless on the server.

JPP-STREAM to JPEG 2000 Codestream Conversion

One of the primary advantages of using tile-parts for JPIP is the separation of JPEG 2000 codestream knowledge from protocol knowledge. When a client receives tile-parts from several different region requests, they can be concatenated with the previously received tile-parts and a legal JPEG 2000 codestream results. When a client receives byte-ranges of precincts each "precinct data-bin" is a linked list of the received data for that precinct. It is possible to build a JPEG 2000 decoder that decodes both JPEG 2000 codestreams and "precinct data-bins", but this requires changes to several portions of a JPEG 2000 codec. Such changes are likely to tie the decoder to the protocol handler by assuming they use the same data formats. Therefore, it is useful to convert the collection of "precinct data-bins" or the JPP-STREAM into a legal JPEG 2000 codestream.

While the server may be providing a JPP-STREAM that is created from a JPEG 2000 codestream, the client typically will not recreate the same JPEG 2000 codestream when it converts the JPP-STREAM back into a codestream because the server may have left out some informational markers from the codestream, or the client may use a different order for packets. However, if complete precincts have been received by the client for all precincts affecting a region, then the sub-image decoded from the client's JPEG 2000 codestream will be identical to the same sub-image decoded by the same code from the server's JPEG 2000 codestream, but the order of data in the codestream is very likely to be different.

Just as for a direct attempt to decode a JPP-STREAM, information in the main and tile-headers is used in order to convert a JPP-STREAM into a JPEG 2000 codestream. It is sufficient to have received all of the main header and all of the tile-headers with data to be decoded. The JPP-STREAM indicates that the last byte of a data-bin has been received by using a different data-bin class code in the message header. A client knows all data for the data-bin has been received if the "completed" class code was received and there are no gaps in the byte ranges received. It is possible in many cases to decode a meaningful image without having all of the main header or tile-part headers. For example, any comment marker segments (COM) in the headers do not affect the ability to decode the image. Likewise a marker segment with the coding conditions for a particular component (COC) are not necessary if no data will be decoded for that component.

A simple set of operations to convert a JPP-STREAM to a JPEG 2000 codestream is given below. These may be performed by processing logic that may comprise hardware (e.g., circuitry, dedicated logic), software (such as run on a general purpose computer system or a dedicated machine), or a combination of both.

1. Write the main header data-bin to the output, but change the progression order in the COD marker segment to CPRL. The output may refer to the JPEG 2000 codestream that is being produced. The term may also be used herein to refer to the memory, disk, or storage device for the codestream.
2. For each tile:
3. Write a SOT marker segment to the output (use 0 for pointer to next tile-part)
4. Write the contents of the tile-header data-bin to the output (In any COD marker segment, change progression order to CPRL)
5. Write a SOD marker segment to the output
6. For each component, position, and resolution in the tile, in the order of progression (CPRL):
7. Determine the number of completely received layers
8. Write the bytes of the precinct data-bin for the precinct for the current component, position, and resolution corresponding to those completed layers to the output
9. Write an empty packet header (a 0 byte) for each packet of each layer which is not complete
10. Update the SOT marker segment and adjust the length to the number of bytes of packet data including 0 bytes written for empty packets in operation 9 actually written
11. Write an EOC marker at the end of the codestream.

In operation 1, the progression order is changed to one that has the progression across quality layers as the last element. The progression orders RPCL or PCRL could also be used in place of CPRL. Having the layer progression last allows each precinct data-bin to be dealt with just one time in operations 6-9. The only change for using RPCL or PCRL is the order of the data-bins are written in operations 6-9 matches the specified progression order.

In operation 3, the SOT marker segment is added for each tile because the current definition of the JPP-STREAM does not include these in the tile-header data-bin for reasons of efficiency. In one embodiment, in order to create a new SOT marker segment, the conversion routine uses the correct tile number. In one embodiment, for this technique, all the parts are output together, so the tile-part index in the SOT should be 0, and the number of tile-parts should be 1. The SOD marker segment is also not used in the JPP-STREAM, and is added in operation 5.

In operation 7, there are several reasons a complete layer might not have been received. JPP-STREAMs are typically sent incrementally, and thus the most recent layer may not have been completely received. Further, it is possible that some of the contributions to the data-bin were not received (perhaps because of transmission over a channel which experiences packet loss). It is even possible that the server is intentionally sending only coded data for some of the code-blocks in a precinct, perhaps because a requested sub-image only requires some of those code-blocks.

Figure 6:
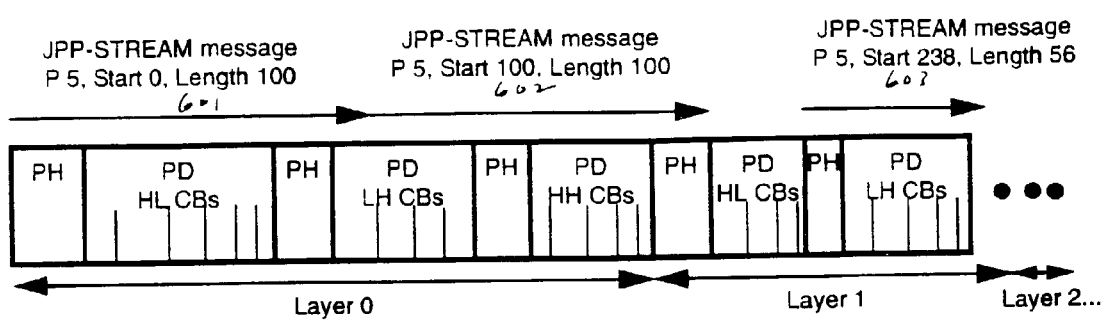
FIG. 6 illustrates a structure of a precinct data-bin.

Since each part of the received data-bin specifies the length and offset, it is easy to determine what portion of the data-bin is available. For example, bytes 0-200, 358-473 and 500-620 might have been received for one precinct data-bin. The number of completely available layers can be determined by a set of operations. First, any data after missing data in the data-bin may be ignored because it cannot be part of the completely available layers. Such a gap in data is shown in FIG. 6, for example, where there is a gap between the JPP-STREAM message 607 and JPP-STREAM message 603. Then the number of layers before the first gap and the location of the last byte in the completed layer is determined. To determine the number of layers the packet headers is decoded as described in JPEG 2000 Part 1. Decoding the packet headers requires much less computation than decoding the entropy coded data for the code-blocks. Decoding the packet headers allows determination of the length of the packet header and the packet data following the packet header. If not all of the data for the code-blocks is not present, the entire layer can be ignored and not written to the JPEG 2000 codestream output.

Because a JPEG 2000 decoder will be expecting a number of packets depending on the number of layers indicated in the main or tile-headers, in one embodiment, empty packets are added for any layers missing in the precinct data-bin. In one embodiment, the number of layers to write is determined by examining the COD marker segments in the main and current tile-header, with information in the tile COD taking precedence over the COD in the main header. For any layers required by the number of layers indicated by the COD marker segment, but for which no data is available, a 0 byte is written for each packet. This byte indicates that there is no packet header and no data for the packet. For the lowest resolution, there is only one empty packet per layer corresponding to the LL subband. For higher resolutions, there are 3 packets per layer corresponding to the LH, HL, and HH subbands.

Alternatives

There are several variations possible on the conversion algorithm with various benefits.

Single Layer Output

One alternative is that all of the layers in the JPP-STREAM could be converted to a single quality layer in the output JPEG 2000 codestream. This can be done by changing the number of layers listed in any marker segment (tile or main header COD) to 1. An exemplary procedure for converting a multi-layer precinct data-bin into a single layer is shown in FIG. 7.

Figure 7:
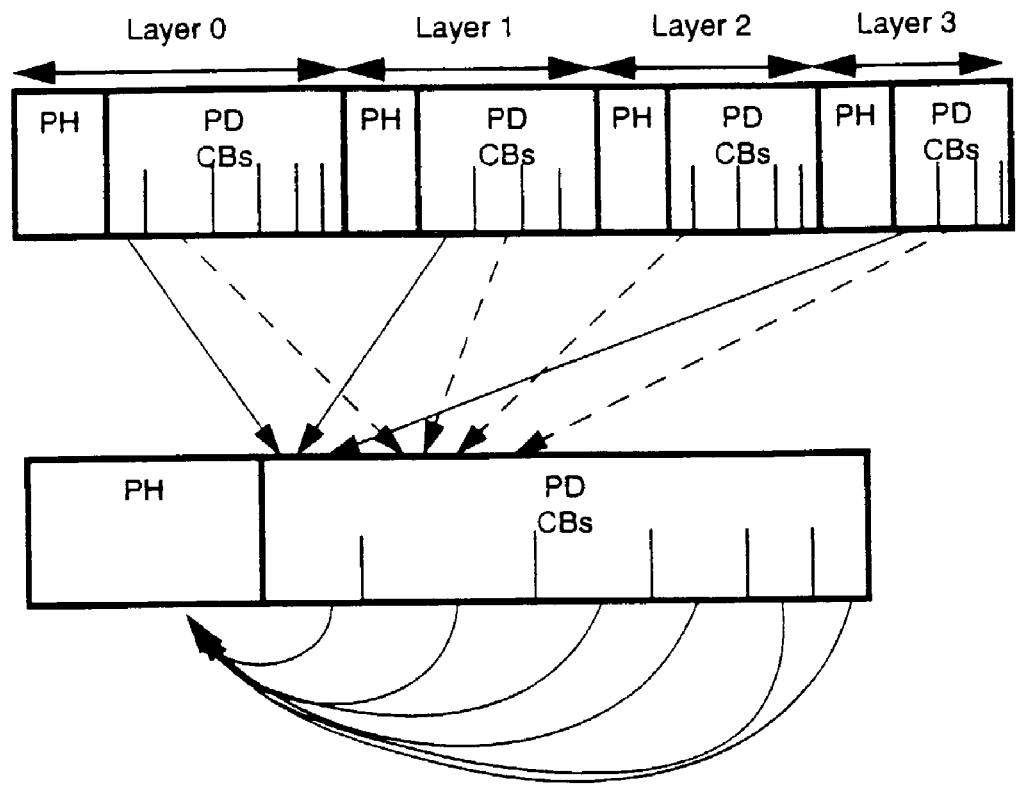
FIG. 7 illustrates a precinct data-bin with only code-blocks for the lowest resolution level.

FIG. 7 shows a precinct data-bin with only code-blocks for the lowest resolution level. Thus, all packets belong to the LL subband (rather than the HL, LH, and HH subbands in FIG.

6). The top part of FIG. 7 shows four layers with packet headers and packet data that have been received for the precinct. First, all of the packet headers are decoded as specified in JPEG 2000 Part 1. This provides information about the length of the data for each code-block in the packet data and the number of coding passes. For every code-block in the precinct, the data from each packet is concatenated. Some packets may not contain any data for a particular code-block. For example, in FIG. 7, the $3^{rd}$ packet has no data for the $1^{st}$ code-block. Once all the data has been combined for each code-block, a packet header can be written for the combined data. This packet header indicates that a code-block is included if it was included in any of the packets that were combined. The length of the data for a code-block stored in the new packet header is the sum of the lengths in for that code-block in the combined packets. The number of coding passes in the new header is the sum of the coding passes from the combined packets.code-block.

One advantage of combining the layers in this way is the JPEG 2000 file will be smaller: there will only be one packet header per subband. The JPEG 2000 code is also likely to decode a combined file faster than a multi-layer file because it only has to decode one packet header. Finally, the empty packet bytes in operation 9 are unnecessary since there is only one layer (unless there is no data at all for the precinct, in which case there must still be one layer of packets written).

Using Precinct Data with Gaps or Incomplete Layers

Figure 8:
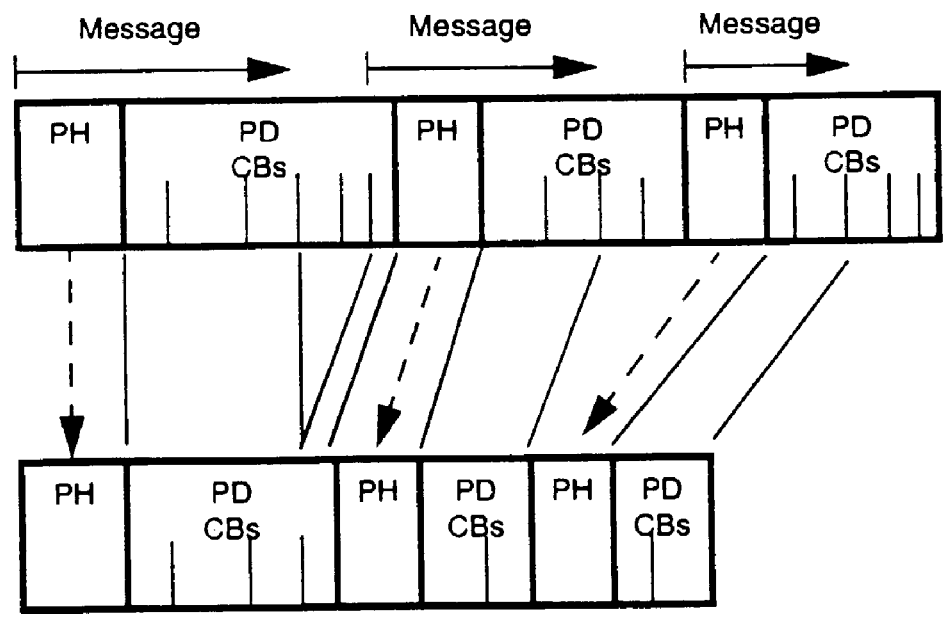
FIG. 8 illustrates converting data-bins with gaps.

Another variation of the technique described above is to make use of more of the received data in the precinct data-bins. In one embodiment, the technique described above ignores any data that is not part of a complete layer, but it is possible that a server might send a complete packet header, and include code-block data for only some of the code-blocks. In one embodiment, to make use of such data, the JPP-stream converter decodes all complete packet headers. If there are gaps in the code-block data within the precinct data-bin, these gaps can be skipped to decode more packet headers. (If there are gaps in a packet header itself decoding usually stops, because the length of the packet header and the position of additional packet headers cannot be determined). In order to make a legal JPEG 2000 codestream from the precinct data-bin with gaps, new packet headers are written for the data available. Code-blocks with no data available are indicated in the new packet header. Code-blocks with partial data available have the correct length written to the output packet header. If a gap occurs within a code-block for one packet, any data for the same code-block in later packets is ignored because it cannot be used correctly by a decoder. See, for example, FIG. 8.

The main advantage of not ignoring incomplete layers is a higher quality image.

Using Other Progression Orders

The conversion technique described above used the CPRL progression order regardless of the progression indicated by the marker segments in the main header data-bin and tile header data-bins. CPRL is a convenient progression order to use because the layer comes last. This means that packets in the JPEG 2000 codestream appear in exactly the same order as in the precinct data-bin. The other progression orders with layer progression last (PCRL, RPCL) can be used equally well. In order to produce an output with one of the other two progressions: LRCP, RLCP, or the complex progressions available with the POC marker, packets from different data-bins are interleaved in the output. Thus for LRCP, the first layer (1 packet for LL subband, 3 packets for HL, HL, and HH) is included in the output for each resolutions, components and position. Then the second layer is added to the output, and so on. If one data bin doesn't have complete packets for a particular layer, a zero byte is included in the output for LL, and 3 zero bytes for LH, HL, and HH.

Calculating Instead of Updating

The technique described to convert a JPP-STREAM into a JPEG 2000 codestream, in one embodiment, wrote a "0" value in the pointer field of the SOT marker segment in operation 3. If there is only one tile in the output codestream, this is a legal value, and there is no need to correct the value in operation 10. If there are multiple tiles, then the SOT marker segment contains a correct pointer for all tile-parts except the last one. The technique describes "rewinding" as if the output was a file or tape output. If the output is in memory, it may be trivial to update the SOT marker segment. However, it may also be desirable to compute the correct length of the marker segment before writing any data to the output so that no "rewinding" is necessary.

Restricted Access

Standard HTTP authentication methods can be used with an interactive protocol to provide selective access to portions of the image. For example, low resolution data might be available to everyone, but higher resolution data might be restricted to only users with a password. If a request is made for a region of the image that contains both restricted and unrestricted data, then there are two ways a server could respond.

A generous server could return all the unrestricted data appropriate for the request, but none of the restricted data. Then if a new request is made that would result in the return of only restricted data, the server issues an error message requiring authentication. This allows browsing of a restricted image without forcing a client to be careful not to "accidentally" request restricted data. However, it might lead to the impression that the client has received all the data for the requested region when in fact only the unrestricted data has been received. Thus a client might fail to ask the user for authentication, operating as if all the data had been received.

A strict server could return an error response whenever a request was made that included any restricted data. In the body of the response, the server may include information about a request that would be accepted without new authentication. The problem with this technique is that a client making a mixed request will not get any data back initially, and the user may not be shown the error message by a poorly written browser.

An example interaction is as follows:

First, there is a request of low resolution image data:

```
GET /image.jp2?fsiz=128,128 HTTP/1.1
Host: www.server1.com
```

The server responds with the data necessary to display this sub-image. Note that in one embodiment the JPP-STREAM is being used, and chunked transfer encoding is used which allows the server to indicate it is beginning to respond to the next request even if it hasn't sent all possible data for the first request.

```
HTTP/1.1 200 OK
Content-type: image/jpp-stream
Transfer-Encoding: chunked
CRLF
[DATA FOR 128 by 128 LOW RESOLUTION IMAGE]
```

The client now requests much higher resolution data (note the larger value for the fsiz parameter):

```
GET /image.jp2?fsiz=2048,2048 HTTP/1.1
Host: www.server1.com
```

The server having determined that the client desires restricted data now prompts for authentication instead of providing image data as a response:

```
HTTP/1.1 401 Unauthorized
WWW-Authenticate: BASIC realm="High Resolution User"
Content-type: text/html
Content-length: 1020
CRLF
[Additional html message explaining authentication required.]
```

Upon receipt of this data, the client would typically display a dialog box asking the user to provide a name and password. Once the client receives this information, the client repeats the request with authentication information:

```
GET /image.jp2?fsiz=2048,2048 HTTP/1.1
Host: www.server1.com
Authorization: BASIC d2FzdGVyW1hNHyibWF
CRLF
```

The server again determines that the request is for restricted data. This time the server examines a "Authorization:" header line and checks the encoded name and password. Assuming these are correct and agrees to provide access to the requested data, the server returns the additional data:

```
HTTP/1.1 200 OK
Content-type: image/jpp-stream
Transfer-Encoding: chunked
CRLF
[DATA FOR 2048 by 2048 LOW RESOLUTION IMAGE]
```

Selective access can be combined with server hand-off (described in more detail below) for additional security or efficiency. Portions of the image available for different levels of authentication could be stored on different servers. For example, low resolution data could be provided from one server without any access limitations, but if higher resolution data was desired, the server could issue a to a more secure server that might require authentication or even communication by or a secure protocol like HTTPS.

Server Hand-Off

Servers and clients often exist on large networks with different bandwidths and bandwidth costs between different points on the network as shown in FIG. 2. Client 201 in FIG. 2 might be browsing a series of HTML pages on Server 201. If there is interest in portions of a sub-image Client 221 might initiate a JPIP session with Server 201 in order to obtain a medium resolution version of an image. A request might look like:

```
GET /image.jp2?fsiz=128,128 HTTP/1.1
Host: www.server1.com
```

Server 201 might generate a response containing the data needed to produce the medium resolution image:

```
HTTP/1.1 200 OK
Content-type: jpt-stream
Transfer-Encoding: chunked
CRLF
[CHUNKED DATA PROVIDING A LOW OR MEDIUM
RESOLUTION IMAGE, TERMINATED BY A ZERO LENGTH
CHUNK]
```

The client may decide a higher resolution image is of interest and issue a follow up request:

```
GET /image.jp2?fsiz=1024,1024 HTTP/1.1
Host: www.server1.com
```

At this point, the server may decide it would rather have a different server provide the high resolution data. There are several reasons this could happen. The "website" might be set up to have all the HTML pages and low resolution images available from one server, but to store higher resolution images on a different server. The high resolution images might be stored on a different server for security reasons, or disk space balancing, or load balancing. The server might redirect the client to a server that is closer to the client (thus improving response for the client).

One method to redirect the client in HTTP is to inform the client that the resource (in this case image.jp2) has moved. This move could be to a different name on the same server, the same name on a different server, or even a different name on a different server. The "Moved Temporarily" HTTP error code has been used so that new clients are still likely to return to the central server on future requests (at which point the server might direct them to a different server). The response to the client's request might look like:

```
HTTP/1.1 307 Moved Temporarily
Location: http://www.server2.com/image.jp2?fsiz=1024,1024
```

The client could repeat the request to the new server, but server 202 would probably resend data the client had already received because it would not have the model of the client's cache that server 201 had. To avoid retransmission of this redundant data, in one embodiment, the client includes information about the client cache, for example with the "model" or "tpmodel" query parameter:

GET/image.jp2?fsiz=1024,1024&tpmodel=1.0-16.2 HTTP/1.1
Host: www.server2.com

The new server can now continue the response with more data:

```
HTTP/1.1 200 OK
Content-type: jpt-stream
Transfer-Encoding: chunked
CRLF
[CHUNKED DATA PROVIDING HIGHER RESOLUTION
IMAGE, TERMINATED BY A ZERO LENGTH CHUNK]
```

Alternative Server Hands Off the Client Cache Info

Instead of requiring the client to inform the new server about its cache, in one embodiment, server 201 provides the cache model it has for client 201 to server 202. The syntax for this is not specified by the JPIP standard, but need only be agreed upon by the implementations on server 201 and server 202. One method would be to pass along the same sort of "model" parameter a client would provide along with information identifying the client. In one embodiment, the client in the redirection response is told to continue using a channel or session id with the new server, for example:

```
HTTP/1.1 307 Moved Temporarily
Location: http://www.server2.com/image.jp2?cid=3453481&fsiz=
   1024,1024
```

The disadvantage of having the server issue a redirect to the client and telling the other server about the client cache model is that some mismatch could arise between the second server and the client. For example, in one embodiment, the client issues a request to the new server before the server had processed the cache model statement from the first server. The first server can reduce any problems by completing the transaction with the second server before issuing the response to the client. In any case, if the second server does not have an accurate cache model it is likely just to repeat data the client already has received from the first server.

Client Hand-Off

A client that has received some data in response to a JPIP request may wish to have another client start with the data the client has received and make additional requests to the server. For example, a desktop computer might browse an image at screen resolution and then the user may decide to print. The printer may want to print higher resolution data, but may want to avoid downloading the image data already downloaded by the desktop computer. There are no explicit methods described in the JPIP standard for doing this, but there are several possibilities that make use of methods defined in the standard.

Suppose the client has issued the request:

```
GET /image.jp2?fsiz=1024,768 HTTP/1.1
Host: www.server1.com
``` and received a response. Client 221 could provide the received JPP-STREAM or JPT-STREAM to client 222 (the printer) along with the URL for the image. In one embodiment, Client 222 then issues a request for more of the image, providing information about the portions of the file it has already received:
GET/image.jp2?fsiz=1024,1024&tpmodel=1.0-16.2 HTTP/1.1
Host: www.server2.com Alternatively, client 221 provides the received JPP-STREAM or JPT-STREAM and the channel-id the client was using to client 222. In this case, the server will believe it is still sending data to the first client. Because of this, client 221 must not continue to use the channels corresponding to the same session; otherwise the server may not send back all the required data for subsequent requests because it will believe the data provided to client 222 was provided to client 221. The request made by client 222 in this case might be:

```
GET /image.jp2?fsiz=2048,2048&cid=351234 HTTP/1.1
Host: www.server1.com
```

If client 221 and client 222 share the same sort of internal data structures, perhaps because the JPIP functionality is provided by the same library, it might be possible to transfer the internal data structure instead of the JPT-STREAM or JPP-STREAM. This might save client 222 the effort of parsing the transferred stream.

Video Thumbnail

JPIP provides a way to request low resolution versions of a whole image simply by using the "fsiz" request parameter. For very low resolutions, these versions are suitable for "thumbnails" or "icons." Similar small summaries can be created for video. In this case, not only is the frame size important, but also selecting some subset of the video frames.

Both the JPP-STREAM and the JPT-STREAM messages can contain information indicating which codestream the message corresponds to. The image portion of a Motion JPEG 2000 image sequence is provided by decoding a sequence of codestreams. Thus, it is simple to create a "video thumbnail" that is a JPP-STREAM or a JPT-STREAM by including codestreams for only some of the frames of the complete video. In one embodiment, the messages includes only low resolution sub-images for each codestream or low and medium resolution.

The current JPIP standard only allows a request to be issued for a single codestream; however, expansion is anticipated. One simple expansion would be to allow the same window parameters to be used with a list of ranges of codestreams. For example, an HTTP request for five frames spaced by 1 seconds apart from a motion JPEG 2000 file with 15 frames per second, might be issued as:

```
GET /video.mj2?fsiz=128,128&stream=1,16,31,46,61 HTTP/1.1
Host: www.server1.com
```

Alternatively, it might be desired to get part of a video from the middle at a medium size. In one embodiment, upon expansion of the definition, this could be done with the following request:
GET/video.mj2?fsiz=320,240&stream=280-320 HTTP/1.1
Host: www.server1.com Instead of using a list of ranges, the extensions to the JPIP standard may provide special names to get information from multiple codestreams. For example the name "1fps" might indicate a desire to receive a one frame per second video summary. This may be used as follows:

```
GET /video.mj2?fsiz=320,240&stream=1fps HTTP/1.1
Host: www.server1.com
```

The current JPIP standard does not specify what audio should be returned with such a request. One technique that may be used with the second request is to return the audio corresponding to the same frames as requested. For the first request, with frames widely spaced, the server might choose to return audio for the time range covered from the first to the last frame, or no audio at all.

JPIP with Discovery Protocols

The JPIP working draft has no mechanism to determine files a JPIP server is willing to provide. Current demonstration systems typically indicate the path to JPEG 2000 files via HTML pages or URLs known in advance to the client. The most common method of initiating a JPIP transport of a sub-image is likely to be some other protocol like HTTP delivery of web pages. It may also be useful to pair JPIP with a discovery protocol such as JINI, Rendevous, or Gnutella. The peer-to-peer protocol would need to recognize the JPIP server or the JPIP data types (JPP-stream and JPT-stream) as a type of resource it was identifying. This would allow clients to find pictures that are available from "nearby" servers (in what ever sense of nearby is used by the discovery protocol). The ability of JPIP to deliver different sub-images to different clients could be especially useful in a situation where clients with different display sizes are discovering the same image because they are moving into proximity of the server.

JPIP on Collections of Images

JPIP provides methods to request a sub-image or even multiple sub-images from the same JPEG 2000 file. There is no explicit mechanism to request similar sub-images from a collection of files. However, a particular implementation could provide an aggregated response to a sub-image request on every file in the directory. For example, the request may be as follows:

```
GET /images/file1.jp2?fsiz=128,128 HTTP/1.1
Host: www.server1.com.
```

This request returns a low resolution sub-image of a single JPEG 2000 file. A client could issue a similar request on a directory:

```
GET /images?fsiz=128,128 HTTP/1.1
Host: www.server1.com
```

The server is able to determine that images refers to a directory rather than a specific image because the server is responsible for converting URLs into resources. Typically, a server does this by examining the file system where resources are being stored. If a URL ends in a file component, the request is on that file; if the URL ends in a directory, the request is on the directory.

A server could issue that request on every file in the directory, accumulate the responses and return them as a multipart MIME response, each part of the response would be a full image, or JPP-STREAM or JPT-STREAM.

Figure 9:
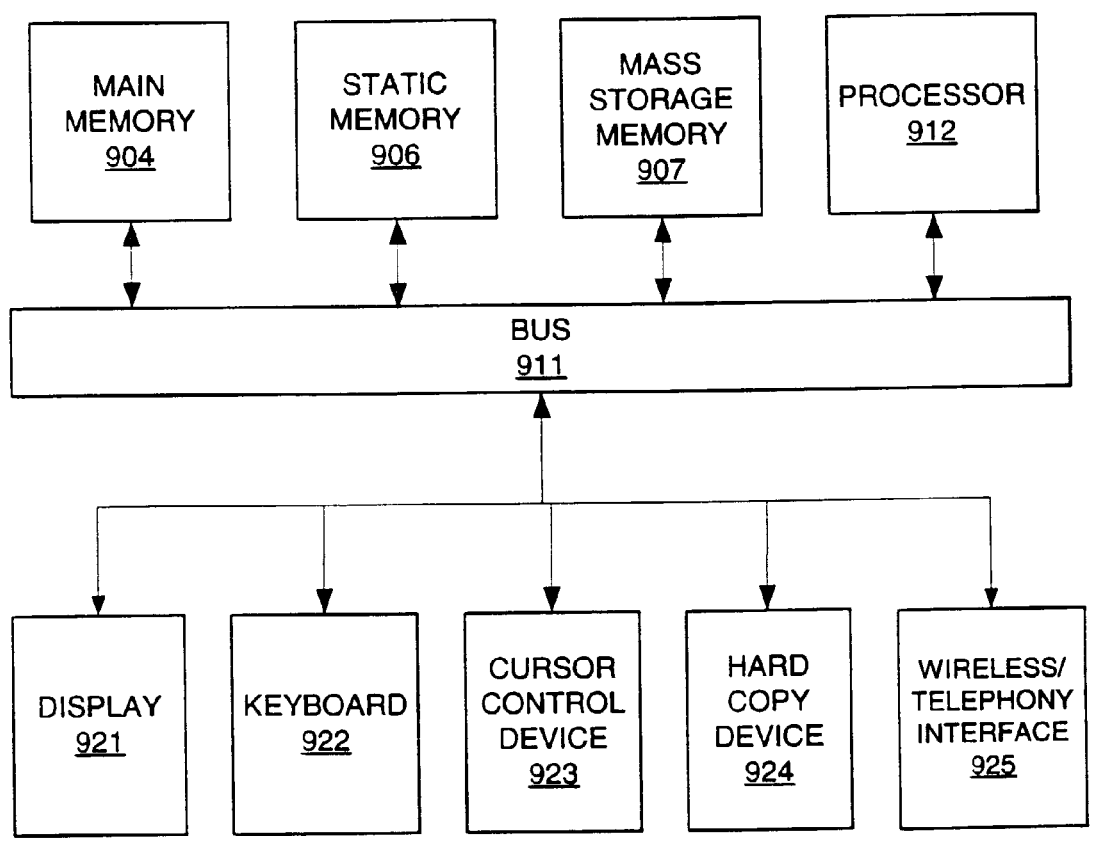
FIG. 9 is a block diagram of an exemplary computer system.

FIG. 9 is a block diagram of an exemplary computer system that may perform one or more of the operations described herein. Referring to FIG. 9, computer system 900 may comprise an exemplary client 950 or server 900 computer system. Computer system 900 comprises a communication mechanism or bus 911 for communicating information, and a processor 912 coupled with bus 911 for processing information. Processor 912 includes a microprocessor, but is not limited to a microprocessor, such as, for example, Pentium™, PowerPC™, Alpha™, etc.

System 900 further comprises a random access memory (RAM), or other dynamic storage device 904 (referred to as main memory) coupled to bus 911 for storing information and instructions to be executed by processor 912. Main memory 904 also may be used for storing temporary variables or other intermediate information during execution of instructions by processor 912.

Computer system 900 also comprises a read only memory (ROM) and/or other static storage device 906 coupled to bus 111 for storing static information and instructions for processor 912, and a data storage device 907, such as a magnetic disk or optical disk and its corresponding disk drive. Data storage device 907 is coupled to bus 911 for storing information and instructions.

Computer system 900 may further be coupled to a display device 921, such as a cathode ray tube (CRT) or liquid crystal display (LCD), coupled to bus 911 for displaying information to a computer user. An alphanumeric input device 922, including alphanumeric and other keys, may also be coupled to bus 911 for communicating information and command selections to processor 912. An additional user input device is cursor control 923, such as a mouse, trackball, trackpad, stylus, or cursor direction keys, coupled to bus 911 for communicating direction information and command selections to processor 912, and for controlling cursor movement on display 921.

Another device that may be coupled to bus 911 is hard copy device 924, which may be used for printing instructions, data, or other information on a medium such as paper, film, or similar types of media. Furthermore, a sound recording and playback device, such as a speaker and/or microphone may optionally be coupled to bus 911 for audio interfacing with computer system 900. Another device that may be coupled to bus 911 is a wired/wireless communication capability 925 to communication to a phone or handheld palm device.

Note that any or all of the components of system 900 and associated hardware may be used in the present invention. However, it can be appreciated that other configurations of the computer system may include some or all of the devices. Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims which in themselves recite only those features regarded as essential to the invention.

We claim:

1. A method comprising:

receiving a first request at a server for a first set of image data corresponding to an image, the first request starting an image viewing session;

responding to the first request with the first set of image data;

receiving a second request at the server, during the image viewing session and subsequent to the first request, for a second set of image data corresponding to a portion of the image generated from the first set of image data;

determining that the second set of image data includes restricted data;

sending a prompt for authentication;

receiving a third request at the server, during the image viewing session, wherein the third request includes the second request along with authentication information;

determining that the third request is for restricted data;

checking the authentication information supplied by the third request at the server; and providing the second set of image data from the server if the authentication information is correct, wherein the second set of image data does not include image data from the first set of image data and includes new image data to refine the image data from the first set for the portion of the image by integrating the second set of image data with the first set of image data.

2. The method defined in claim 1 wherein responding to the request is performed using JPP-STREAM.

3. The method defined in claim 1 wherein the authentication information comprises a name and a password.

4. The method defined in claim 1 wherein checking the authentication information comprises checking an authorization header line for the authentication information.

5. The method defined in claim 1 wherein the first set of image data comprises image data at a first resolution and the second set of image data is at a second resolution higher than the first resolution.

6. An article of manufacture comprising one or more recordable media having instructions stored thereon which, when executed by a system, cause the system to:
receive a first request at a server for a first set of image data corresponding to an image, the first request starting an image viewing session;
respond to the first request with the first set of image data;
receive a second request at the server, during the image viewing session and subsequent to the first request, for a second set of image data corresponding to a portion of the image generated from the first set of image data;
determine that the second set of image data includes restricted data;
send a prompt for authentication;
receive a third request at the server, during the image viewing session, wherein the third request includes the second request along with authentication information;
determine that the third request is for restricted data;
check the authentication information supplied by the third request at the server; and
provide the second set of image data from the server if the authentication information is correct, wherein the second set of image data does not include image data from the first set of image data and includes new image data to refine the image data from the first set for the portion of the image by integrating the second set of image data with the first set of image data.

7. The article of manufacture defined in claim 6 wherein the instructions to respond to the request uses a JPP-STREAM.

8. The article of manufacture defined in claim 6 wherein the authentication information comprises a name and a password.

9. The article of manufacture defined in claim 6 wherein the instructions to check the authentication information comprise instructions which, when executed by the system, cause the system to check an authorization header line for the authentication information.

10. The article of manufacture defined in claim 6 wherein the first set of image data comprises image data at a first resolution and the second set of image data is at a second resolution higher than the first resolution.

11. An apparatus comprising:
means for receiving a first request for a first set of image data corresponding to an image, the first request starting an image viewing session;
means for responding to the first request at a server with the first set of image data;
means for receiving a second request at the server, during the image viewing session and subsequent to the first request, for a second set of image data corresponding to a portion of the image generated from the first set of image data;
means for determining that the second set of image data includes restricted data;
means for sending a prompt for authentication;
means for receiving a third request at the server, during the image viewing session, wherein the third request includes the second request along with authentication information;
means for determining that the third request is for restricted data;
means for checking the authentication information supplied by the third request at the server; and
means for providing the second set of image data from the server if the authentication information is correct, wherein the second set of image data does not include image data from the first set of image data and includes new image data to refine the image data from the first set for the portion of the image by integrating the second set of image data with the first set of image data.

12. The apparatus defined in claim 11 wherein responding to the request is performed using JPP-STREAM.

13. The apparatus defined in claim 11 wherein the first set of image data comprises image data at a first resolution and the second set of image data is at a second resolution higher than the first resolution.

14. A method comprising:
a first server operating within a JPIP session with a client, including receiving a first request from the client for a sub-image of an image, wherein the client utilizes a session identifier with the first server;
generating a response containing data needed to create the sub-image;
receiving a second request from the client for a different portion of visible image data for the image, wherein the different portion of visible image data is a different sub-image of the image; and
the first server informing the client that the different portion of visible image data has moved to a second server to redirect the client to the second server to obtain the different portion of visible image data for the image, wherein the first server informs the client to continue using the session identifier for the first server with the second server.

15. The method defined in claim 14 further comprising the first server indicating to a second server that the client has a portion of the requested data before redirecting the client to the second server.

16. The method defined in claim 15 wherein the first server indicating to a second server that the client has a portion of the requested data comprises sending cache model information about the client to the second server.

17. The method defined in claim 14 wherein the first server redirecting the client to a second server comprises informing the client that the different version of the sub-image has moved.

18. The method defined in claim 14 further comprising the client repeating the second request to the second server.

19. The method defined in claim 18 further comprising indicating to the second server data already stored by the client that does not need to be resent.

20. The method defined in claim 14 further comprising the first server sending the second server information maintained by the first server indicating data related to the sub-image that the client already has.

21. An article of manufacture comprising one or more recordable media having instructions stored thereon which, when executed by a system, cause the system to:

receive a first request at a first server from the client during a JPIP session for a sub-image of an image, wherein the client utilizes a session identifier with the first server;

generate a response containing data needed to create the sub-image;

receive a second request from the client for visible image data of a different portion of the image, wherein the different portion of image data is a different sub-image of the image; and redirect the client to a second server to obtain the visible image data of the different portion of the image, wherein the redirection by the first server informs the client to continue using the session identifier with the second server inform the client that the visible image data of the different portion of image has moved to a second server to redirect the client to the second server to obtain the visible image data of the different portion of the image, wherein the first server informs the client to continue using the session identifier with the second server.

22. The article of manufacture defined in claim 21 further comprising the first server indicating to a second server that the client has a portion of the requested data before redirecting the client to the second server.

23. The article of manufacture defined in claim 22 wherein the first server indicating to a second server that the client has a portion of the requested data comprises sending cache model information about the client to the second server.

24. The article of manufacture defined in claim 21 wherein the first server redirecting the client to a second server comprises informing the client that the different version of the sub-image has moved.

25. The article of manufacture defined in claim 21 further comprising the client repeating the second request to the second server.

26. The article of manufacture defined in claim 25 further comprising indicating to the second server data already stored by the client that does not need to be resent.

27. The article of manufacture defined in claim 21 further comprising the first server sending the second server information maintained by the first server indicating data related to the sub-image that the client already has.

28. An apparatus comprising:

means for receiving a first request from a client during a JPIP session with a first server for a subimage of an image, wherein the client utilizes a session identifier with the first server;

means for generating a response containing data needed to create the sub-image;

means for receiving a second request from the client for visible image data of a different portion of the image, wherein the different portion of visible image data is a different sub-image of the image; and means for informing the client that the different portion of visible image data has moved to a second server to redirect the client to the second server to obtain the visible image data of the different portion of the image, wherein the first server informs the client to continue using the session identifier with the second server.

* * * * *